3,578,703
PROCESS FOR PRODUCING METHYL FORMATE FROM ALKALI OR ALKALINE EARTH FORMATE
Erwin F. Schoenbrunn, Ridgefield, and Edward H. Durell, Monroe, Conn., assignors to Escambia Chemical Corporation, Pace, Fla.
No Drawing. Filed Apr. 23, 1968, Ser. No. 723,603
Int. Cl. C07c 67/00
U.S. Cl. 260—488                                                9 Claims

ABSTRACT OF THE DISCLOSURE

A process for the production of methyl formate from alkali or alkaline earth formate by reaction with at least an equivalent quantity of methanol and strong acid in the presence of sufficient water to keep the reactant formate in solution, followed by distillation of the methyl formate produced. Sodium formate and sulfuric acid are preferred reactants. Methanol may be recovered by increasing the distillation temperature to at least the boiling point of methanol.

---

The present invention relates to an improved method for the production of methyl formate by the reaction of alkali or alkaline earth formate with a strong acid and methanol, more particularly, to reacting the formate in an aqueous solution.

It has been known previously to react an alkali or alkaline earth formate with strong acid to form formic acid and a salt. It is also known to form methyl formate from methanol with the methyl formate being subsequently distilled. However, such mixtures frequently form stiff slurries which are difficult to handle in industrial equipment unless large excesses of methanol are used. Use of such excess methanol is uneconomical.

It is accordingly, an object of the present invention to overcome the disadvantages of the prior art.

It is primarily an object of the present invention to produce high yields of methyl formate from alkali or alkaline earth formates in aqueous solution and a small excess of methanol and strong acid, thus eliminating the need for the often troublesome and expensive equipment necessary for handling solids and slurries.

It is further an object of the present invention to produce a pure methyl formate from an impure alkali formate obtained as a by-product of the production of aldol condensation reactions to produce polyols.

These and other objects and advantages of the present invention will be apparent to those skilled in the art from reading the present description.

The objects of the present invention are achieved by the unexpected discovery that use of an aqueous solution of alkali or alkaline formate in the esterification does not hinder the efficiency of the process. This is surprising since it is known that water hydrolyzes methyl formate to methanol and formic acid. Good practice in esterification technology indicates minimization or removal of water from the reaction mixture. Thus, it is quite surprising that a high conversion is obtained in the presence of substantial quantities of water.

The production of methyl formate in the present invention is carried out by reacting an aqueous solution of an alkali or alkaline earth formate with an excess of methanol and strong acid, followed by a distillation of the methyl formate produced. The excess methanol may be recovered by a subsequent distillation.

Methyl formate, produced by the process of the present invention, has utility as a fumigant and fungicide and as a chemical intermediate for the production of such useful compounds as dimethylformamide.

Although the process of the present invention finds particular utility in the production of methyl formate, it will be apparent to those skilled in this art, that it is also applicable to any ester that has a boiling point below that of water.

The present process is especially advantageous for the conversion to methyl formate of waste liquors obtained as a by-product of the production of aldol condensation reactions to produce polyols. An example of such a by-product mixture that may be used as a starting material in the present invention is shown in Pat. No. 3,357,899 to Robeson. As shown in the Robeson patent, the by-products contain substantial water content which it would be necessary to eliminate to perform the reaction in the substantial absence of water, the standard esterification technique.

Any alkali or alkaline earth formate may be utilized as a starting material since the cation, itself, is not critical in the reaction. Sodium formate is especially useful as a starting material since it is a typical by-product in the aldol condensation reaction shown in the Robeson patent. Although not intended as limiting, as used herein, sodium will be referred to as the alkali metal or alkaline earth metal component of the formate, which may include lithium, potassium, calcium and magnesium.

At least one mole of methanol is required per equivalent of formate to assure complete formate conversion. Large excesses of methanol, necessary to handle the sodium formate slurry of standard esterification without water, may be utilized, but this is uneconomical. It is preferred to use a small excess such as 1.2 moles of methanol per mole of sodium formate.

At least one equivalent of strong acid is required per equivalent of formate. A small excess of strong acid, such as 1.1 equivalent of acid per equivalent of formate results in a rapid reaction rate. Higher amounts of strong acid may result in decomposition of the formate. The acid must have a dissociation constant (K value) greater than that of formic acid ($1.77 \times 10^{-4}$ at 20° C.). Although not intended to be limiting, some preferred acids include; sulfuric acid, hydrochloric acid, phosphoric acid, and trichloroacetic acid.

The temperature in the reactor is maintained at the boiling point of the mixture which changes during the course of the reaction. When the reaction begins, the temperature is approximately in the range of 60° C. to 70° C. at one atmosphere. At the termination of the reaction, the temperature range is approximately in the range of 95° C. to 105° C. at one atmosphere.

The temperature at the top of the distillation column, used in connection with the reactor, should be adjusted to assure that where the methyl formate is distilled into a receiver, it is essentially free from the methanol. This is accomplished by maintaining the temperature at the top of the column slightly above the boiling point of methyl formate at the employed pressure until the reaction is essentially complete. For example, the boiling point of methyl fromate at one atmosphere is 31.5° C. A preferred means for controlling the head temperature is by adjusting the reflux ratio. When the temperature starts to increase above the boiling point of methyl formate, it is due to methanol coming off with the methyl formate. At this point the reflux ratio is increased by the closing of an outlet valve of the distillation column, and the amount of product drawn off decreases. When the temperature drops toward the boiling point of methyl formate, the valve is opened. When most of the methyl formate is distilled, the system is adjusted to maintain the head temperature above the boiling point of methanol and the methanol is recovered in a second receiver. Alternatively, the reflux ratio may be held constant during the course of the reaction and the heat input to the reaction may be controlled to keep the head temperature only slightly above the boiling point of methyl formate until most of the methyl formate has been distilled.

Although the rate of reaction increases with pressure, this increased rate is not important enough to operate at very high pressure. High pressure equipment and operation is expensive. However, it is advantageous to operate at an elevated pressure for condensation of the methyl formate product without the necessity of extensive cooling. A pressure of between 1 and about 15 atmospheres is preferred.

To obtain the improvement of the present invention, the amount of water present in the reaction mixture should be sufficient to keep the sodium formate in solution at the boiling point of the solution. For example, at 60° C. and 100° C. the solubilities of sodium formate in water are 120 and 155 parts respectively, by weight of sodium formate per 100 parts of water. It is preferred to utilize as little water as necessary since too much water can slow down the reaction rate. A preferred upper limit of water dilution is a 5% solution of sodium formate in the water. At lower concentrations the reaction is too slow.

In one advantageous embodiment, there should be sufficient water to maintain in solution any insoluble sodium salt that may form during the reaction. For example, if sulfuric acid is the selected strong acid, enough water must be present to keep sodium sulfate formed in solution, since sodium sulfate is less soluble than the reactant sodium formate. Even if the sodium sulfate is not all in solution, the slurry is not difficult to handle compared to the sodium formate slurry. The purpose of keeping the sodium sulfate dissolved is basically to prevent scaling in the reactor by a precipitate.

A preferred technique for the prevent of sodium sulfate scaling of the reactor is by the use of live steam. The solubility-temperature relationship of sodium sulfate is inverted. As the temperature increases over 32° C., the solubility of sodium sulfate in water decreases. Therefore, the salt tends to collect and scale where the temperature is highest, i.e. on a heating coil. Hence, the use of live steam eliminates this problem. However, as the steam condenses, the reactants become dilute and the reaction proceeds more slowly. If it is not possible to supply sufficient heat via the steam before the reaction becomes too slow, indirect heating can be applied at this point without scaling, since the reaction mixture probably would be dilute enough to maintain the sodium sulfate in solution.

In the process of the present invention conversions to methyl formate are close to 100%. In addition, recovery of unreacted methanol recovery is close to 100%.

In order more clearly to disclose the nature of the present invention, specific examples of the practice of the invention are hereinafter given. It should be understood, however, that this is done by way of example and is intended to limit neither the scope of the invention nor the ambit of the appended claims. Parts are expressed in terms of parts by weight, unless otherwise stated.

EXAMPLE 1

A solution was prepared from 75° g. of water and 53° g. of by-product, impure sodium formate, containing 510 g. sodium formate by analysis. This solution was placed in a flask and there was added 573 g. of 70% sulfuric acid and 360 g. of methyl alcohol. The mixture was heated to the boiling point and the volatile products were distilled through a 2 foot column attached to the flask, regulating the rate at which product was removed as distillate so that the head temperature remained below 34° C. There was collected over the period of 130 minutes, 438.5 g. of distillate containing 423.7 g. of methyl formate and 14.8 g. of methyl alcohol, corresponding to 94% conversion of sodium formate to methyl formate. An additional 17.1 g. of methyl formate was obtained with the excess methyl alcohol when it was distilled from the reaction mixture, to increase the conversion of sodium formate to methyl formate to 98%.

EXAMPLE 2

147 g. (2.10 equivalents of H$^+$) of 70% sulfuric acid was added to 136 g. (2.00 equivalents of Na$^+$) of sodium formate in a solution with 200 g. of distilled water. Then 80 g. (2.50 moles) of methanol was added. The reaction was carried out at the boiling point of the mixture (70° C. to 98° C.). Methyl formate was distilled at 32.5 to 34° C. The product was analyzed in three cuts:

| | Wt. cut, g. | Percent methyl formate | Wt. methyl formate |
|---|---|---|---|
| Cut Number: | | | |
| 1 | 110.9 | 96.74 | 107.4 |
| 2 | 13.56 | 74.09 | 10.0 |
| 3 | 21.94 | 3.22 | 0.7 |
| Total | | | 118.1 |

$\frac{118.1}{120.1} \times 100 = 98.3\%$ conversion to methyl formate.

EXAMPLE 3

The procedure of Example 2 was followed except the boiling point of the reaction mixture was 60° C. to 100° C. The reactants were as follows:

122.5 g. sodium formate—1.80 equivalent Na$^+$
180.0 distilled H$_2$O
154 g. H$_2$SO$_4$(70%)—2.20 equivalents H$^+$
96 g. Methanol—3.00 moles Close to 100% the theoretical yield of methyl formate was obtained.

EXAMPLE 4

154 g. (2.20 equivalents of H$^+$) of sulfuric acid was added to 136 g. (2.00 equivalents of Na$^+$) of sodium formate in a solution with 200 g. of distilled water. 96 g. (3.00 moles) of methanol was added. Steam was fed to the mixture. The temperature of the reaction mixture varied from 63° C. to 101° C. The distilled methyl formate was 96% of the theoretical conversion. Methanol recovery was substantially complete.

The terms and expressions which have been employed are used as terms of description and not of limitation, and there is no intention in the use of such terms and expressions of excluding any equivalents of the features shown and described or portions, but it is recognized that various modifications are possible within the scope of the invention claimed.

What is claimed is:

1. A method for the production of methyl formate comprising; reacting a member selected from the class consisting of alkali metal and alkaline earth metal formates with at least an equivalent quantity of methanol and of an acid of a K value greater than formic acid in the presence of sufficient water to hold the alkali metal or alkaline earth metal formate substantially in solution at a reaction temperature of from about 60° C. to about 105° C., and distilling methyl formate from the reaction mixture.

2. A method according to claim 1, wherein the temperature is sufficient to maintain the reaction mixture at its boiling point.

3. A method according to claim 1 in which the formate is sodium formate.

4. A method according to claim 1 in which the acid is sulfuric acid.

5. A method according to claim 1 in which the distillation temperature is maintained at a temperature of at least the boiling point of methyl formate and below the boiling point of methanol at the reaction pressure.

6. A method according to claim 5 comprising, in addition, distilling methyl formate to substantially complete the reaction and then recovering the methanol by raising the distillation temperature to at least the boiling point of methanol.

7. A method according to claim 1 in which the reaction pressure is from 1 to 15 atmospheres.

8. A method according to claim 4 in which there is sufficient water present to maintain the sodium sulfate formed in the process in solution.

9. A method according to claim 1 in which the amount of water present is no more than is necessary to form a 5% solution of sodium formate in water.

References Cited
UNITED STATES PATENTS

| | | | |
|---|---|---|---|
| 2,433,323 | 12/1947 | Reiter et al. | 260—488 |
| 2,575,722 | 11/1951 | Maincon | 260—488 |
| 1,039,875 | 10/1912 | Wolff | 260—488 |

LORRAINE A. WEINBERGER, Primary Examiner

V. GARNER, Assistant Examiner